D. F. McGILL.
SYSTEM OF RAISING SUNKEN SHIPS.
APPLICATION FILED JULY 5, 1916. RENEWED MAR. 14, 1921.

1,393,894.

Patented Oct. 18, 1921.
6 SHEETS—SHEET 6.

UNITED STATES PATENT OFFICE.

DANIEL F. McGILL, OF PORTLAND, OREGON.

SYSTEM OF RAISING SUNKEN SHIPS.

1,393,894. Specification of Letters Patent. Patented Oct. 18, 1921.

Application filed July 5, 1916, Serial No. 107,604. Renewed March 14, 1921. Serial No. 452,227.

*To all whom it may concern:*

Be it known that I, DANIEL F. McGILL, a citizen of the United States, residing in Portland, county of Multnomah, State of Oregon, have invented a new and useful System of Raising Sunken Ships, of which the following is a specification.

My invention relates to devices and apparatus for raising sunken ships and the object of my invention is to provide a method of salvaging sunken ships and the contents thereof.

I accomplish the above object by means of the apparatus illustrated in the accompanying drawings which therefore become a part of this application for Letters Patent, in which like characters of reference indicate like parts throughout the several views, and in which:—

Fig. 14 is a perspective view of a detail of said periscope.

In general my invention consists of a system comprising the following units:

First: Means for locating the sunken ship and for observing all operations thereon while said operations are being carried on under the water, illustrated in Figs. 1, 2 and 3.

Figure 1:
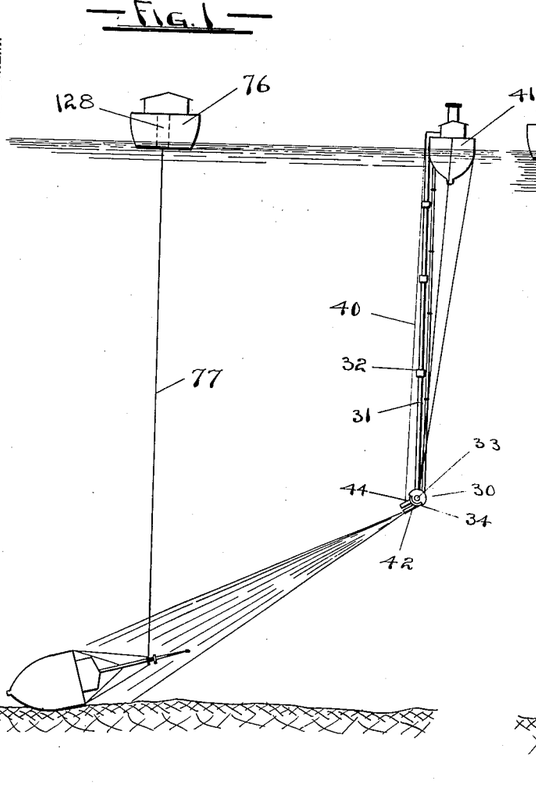
Figure 1 represents the first operation in raising a ship by my system.
Figure 2:
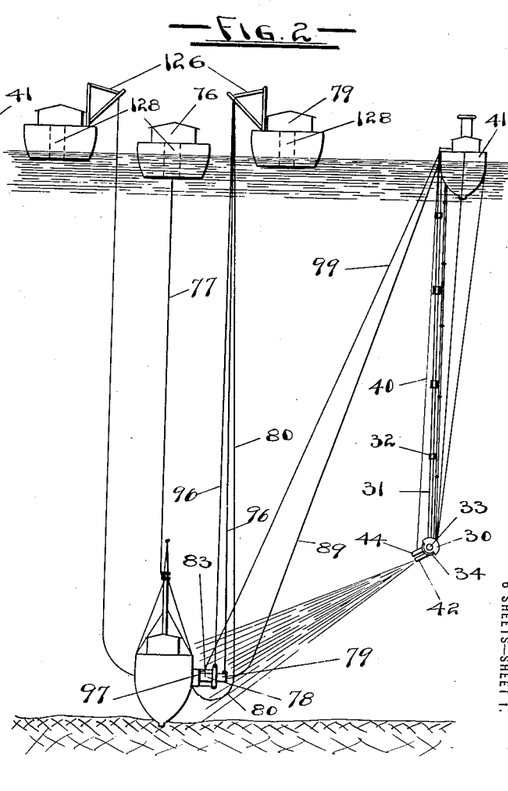
Fig. 2 represents the second operation in raising the ship.
Figure 3:
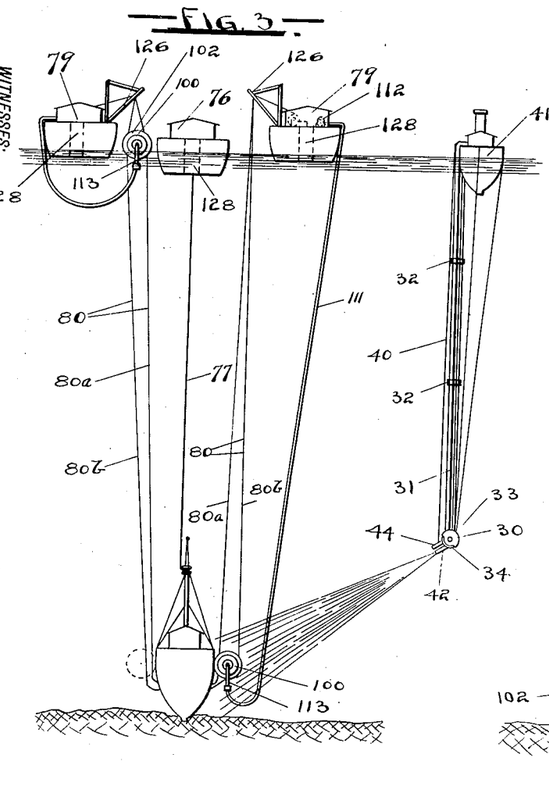
Fig. 3 represents the third operation in raising the ship.

Second: Means for righting the submerged ship and holding same in a substantially upright position during subsequent operations thereon, as illustrated in Figs. 1, 2 and 3.

Third: Means for attaching hoisting cables to the submerged ship, as illustrated in Fig. 2.

Figure 4:
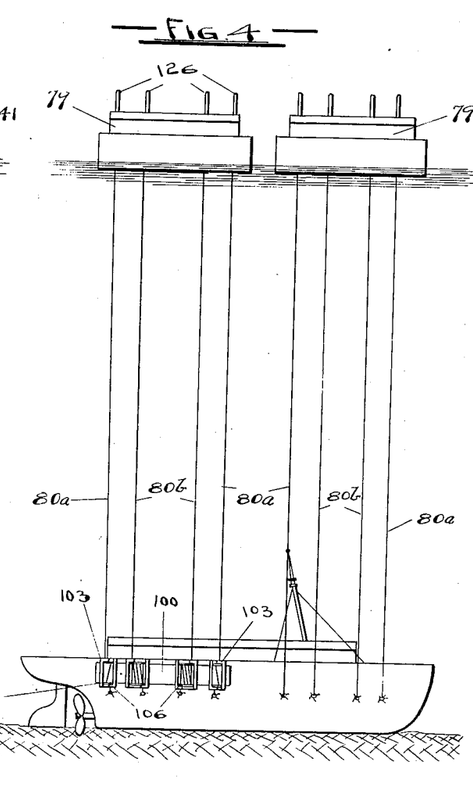
Fig. 4 is a side elevation of the subject matter of Fig. 3.

Fourth: Means for lowering tanks alongside the submerged ship and for locating and securing said tanks in proper position, as illustrated in Figs. 3 and 4.

Fifth: Means for operating said tank for floating the ship by pumping air into said tanks.

Figure 5:
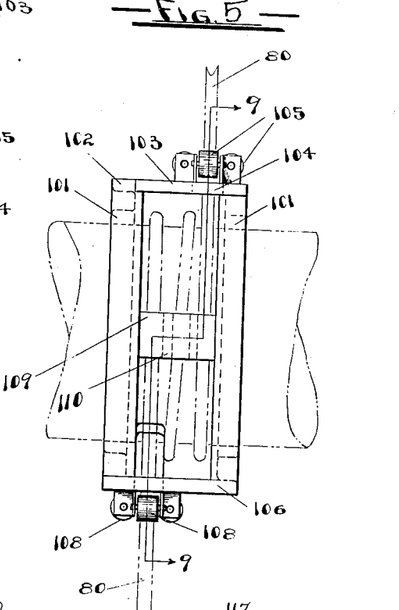
Fig. 5 is a side elevation of one of the rope cages employed upon the raising tanks shown in Figs. 3 and 4.
Figure 6:
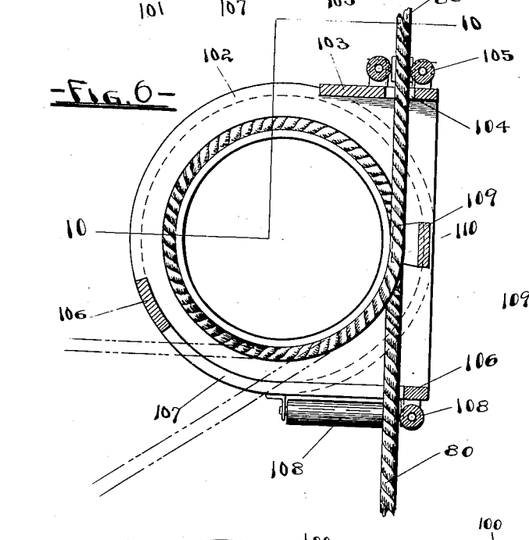
Fig. 6 is a sectional view upon line 9—9 of Fig. 5.

Sixth: Means for providing auxiliary tanks or a pneumatic raft adapted to be placed beneath the submerged ship and operate similarly to the previous mentioned tanks, said raft being adapted to use in conjunction with said previously mentioned tanks, or for use without said tanks, as illustrated in Figs. 5 and 6.

The first of the said units comprising my system, is that of means for locating the ship and also for observing the submerged operations thereon and consists of a combined telescope and periscope, which I term a telescopic periscope and which is illustrated in detail in Figs. 10, 11, 12, 13, 14, 18, 19, 20, 21, 22, and 23.

This periscope is suspended from a tug 41 as shown in Figs. 1, 2 and 3, said tug being the observatory from which all operations are directed.

The telescopic periscope performs two functions, namely illuminating the submerged ship and permitting a view of the same to be obtained from the tug 41.

At the bottom of said periscope is a head 30 the inside periphery of which is a portion of a circle, said head being secured to a pipe 31 extending from the head to the tug.

Said pipe 31 is made up of various lengths coupled together by couplings 32 for the purpose of varying the depth of submersion of the head 30.

Mounted within head 30 by means of shafts 33 is female head 34 adapted to turn about shafts 33 through a substantial angle, the outer periphery of said head 34 being in such close contact with the inner periphery of head 30 as to exclude all water from the interior of said heads.

Said head 34 has therein an opening 35 adapted to register with the opening in the lower end of pipe 31 throughout the entire range of angular motion of the head 34.

Said head 34 has thereon two projecting arms 36 and 37, the lower arm 36 being the illuminating member, and the upper arm 37 being the telescopic member, each of said arms being of hollow or tubular construction.

Figure 15:
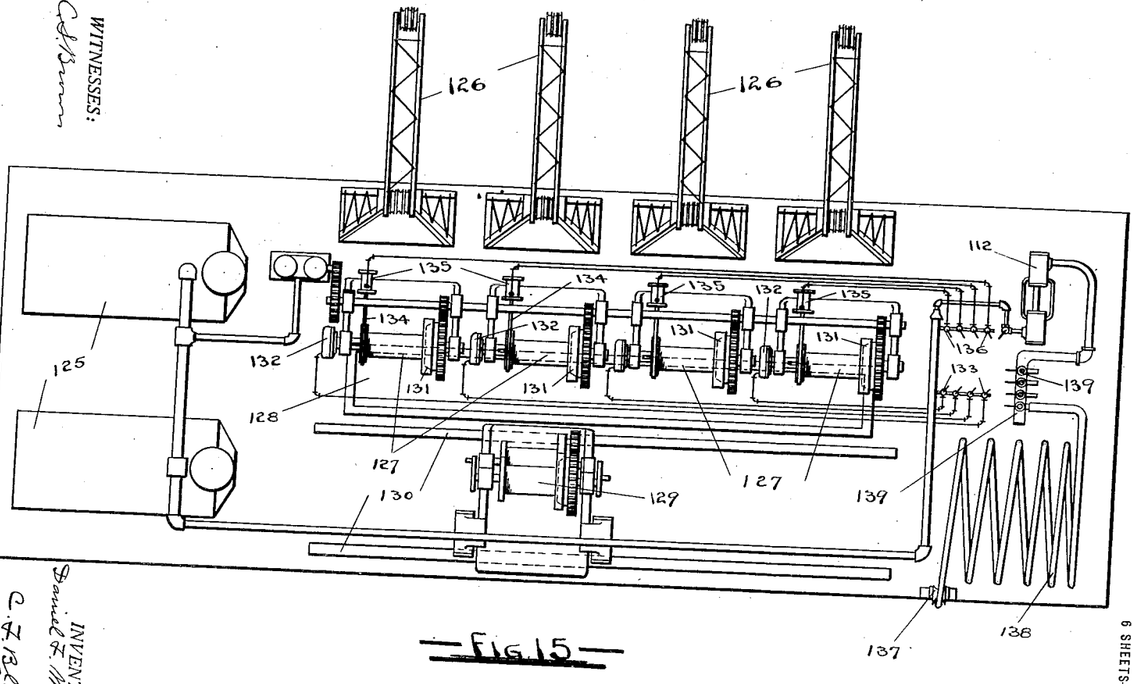
Fig. 15 is a plan view of the deck of one of the barges, showing diagrammatically the general arrangement of the machinery thereon.

For the purpose of illuminating the submerged ship there is located within arm 36 an electric light 38 having to the rearward thereof a reflector 39, said lamp being connected by an electric cable 40 to any convenient source of electric power upon the tug 41, as shown in Fig. 15.

Slidably mounted upon arm 36 is a water tight cap 42 having a lens 43 in the forward end thereof, and by the proper movement of said cap the light from lamp 38 is focused upon any portion of the submerged ship as desired.

Figures 10, 11, 12, 20, 21:
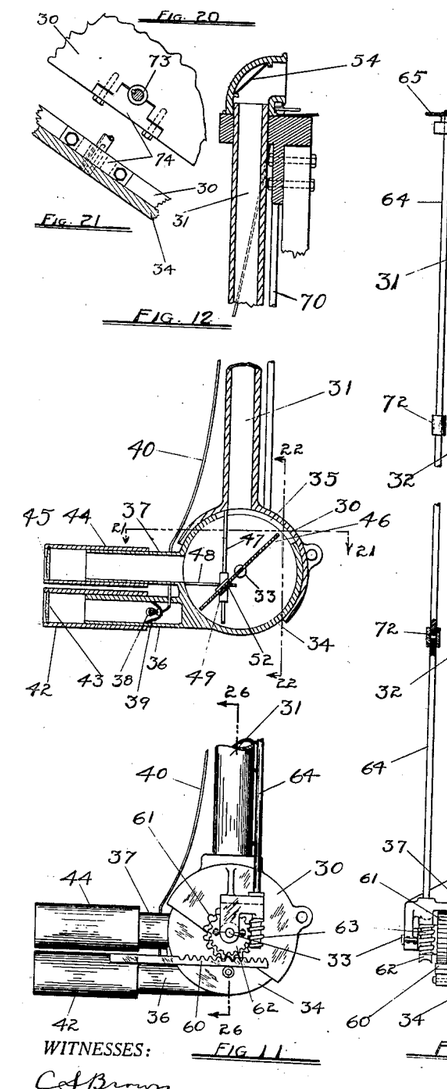
Fig. 10 is an end elevation of the telescopic periscope as shown in use in Figs. 1, 2 and 3.
Fig. 11 is a side elevation of the lower end of said periscope.
Fig. 12 is a sectional elevation of said periscope.
Fig. 20 is a detail side elevation upon an enlarged scale of the bearing for shafts.
Fig. 21 is a front elevation of the subject matter of Fig. 20.
Figure 13:
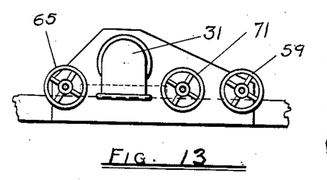
Fig. 13 is a plan view of the top of said periscope.

The telescopic arm 37 is fitted with a slidable water tight cap 44 having a lens 45 in the forward end thereof, by means of proper movement of which cap the image of the submerged ship or any desired portion thereof is focused upon a reflecting screen 46 located within heads 30 and 34, and adapted to swing upon the axis thereof in unison with head 34, as shown in Fig. 12.

Said reflecting screen is disposed so as to reflect the rays of the light falling thereon from arm 37 and lens 45 upward through pipe 31, and the unison of action of said reflecting screen and head 34 is accomplished by the two rods 47 and 48 integrally attached to head 34 within the same, as shown in Fig. 12.

One of the said rods, 47 depends within head 34 from the lower end of pipe 31, and is in exact alinement with the forwardmost portion of the inner surface thereof, the other rod 48 projecting within head 34 from the inner end of arm 37, and is in exact alinement with the lowermost portion of the inner surface thereof.

Figures 8, 9, 22, 23:
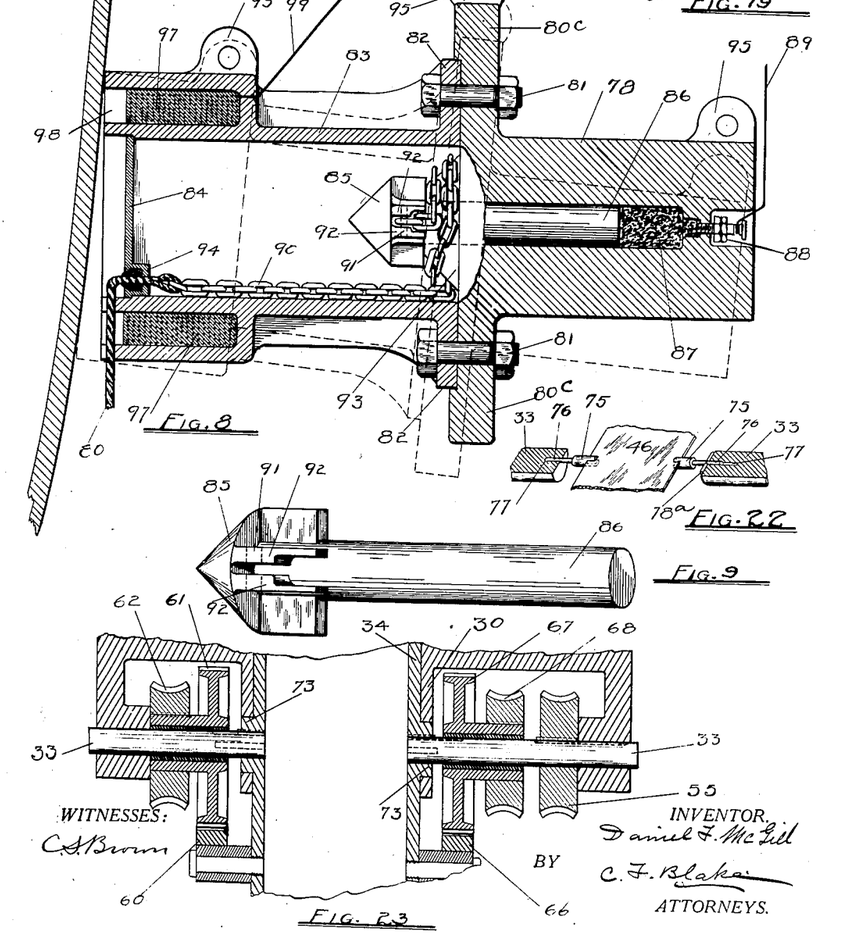
Fig. 8 is a longitudinal sectional elevation of the gun shown in use in Fig. 2.
Fig. 9 is a perspective view of the projectile used in said gun.
Fig. 22 is a fragmentary perspective view showing the method of supporting the reflector.
Fig. 23 is a sectional elevation upon line 26—26 of Fig. 11, shown upon an enlarged scale, the reflection mirror being outlined.

Said rods are offset one relatively to the other so they may pass each other in a vertical plane as shown in Figs. 21 and 22, but when viewed in a longitudinal vertical plane the axes of said rods intersect, as shown in Fig. 12.

Figure 17:
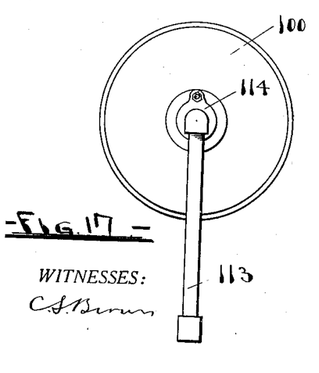
Fig. 17 is an end elevation of the subject matter in Fig. 16.
Figure 18:
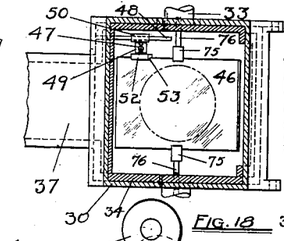
Fig. 18 is a sectional plan view upon line 21—21 of Fig. 12.
Figure 19:
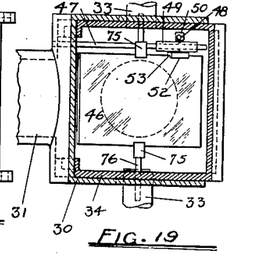
Fig. 19 is a sectional elevation upon line 22—22 of Fig. 12.

Slidably mounted upon rod 47 is a block 49, and pivotally mounted upon one side of said block is a block 50 having therein an orifice 51 adapted to receive rod 48, as shown in detail in Fig. 17, and Figs. 18 and 19.

Pivotally mounted upon that side of block 49 opposite to block 50 and upon the axis thereof extends a block 52 having a groove 53 in the face thereof adapted to receive one edge of the reflecting screen 46, as shown assembled in Figs. 12, 18 and 19 and in detail in Fig. 14.

As viewed in a longitudinal axial plane such as shown in Fig. 15, the outermost portion of the inner surface of pipe 31, the lowermost portion of the inner surface of arm 37, and the reflecting surface of screen 46 always intersect at a common point throughout the entire range of movement of head 34 and screen 46.

By means of the device just described, and illustrated in detail in Fig. 17, the screen is always kept in position to reflect the light rays received thereon upward through pipe 31, at the upper end of which is located a reflecting screen 54, as shown in Figs. 10 and 12, upon which the observer may see the image of that portion of the submerged ship illuminated by the light from arm 36.

To accomplish the rotation of head 34 within head 30 there is provided a worm wheel 55 secured upon one of shafts 33, which shaft is rotatably mounted in head 30 and upon which shaft, head 34 is secured.

A worm 56 meshes with worm wheel 55 and is mounted upon the lower end of a shaft 57, said shaft being operated through a pair of spur gears 58 by a hand wheel 59 adjacent the upper end of pipe 31, as shown in Fig. 10.

To accomplish the focusing of the periscope light upon the submerged ship or a portion thereof there is provided a rack 60 secured to cap 42 and meshing with a spur gear 61, said gear being rotatably mounted upon one of shafts 33, as shown in Figs. 10, 11, and 23.

Integrally attached to gear 61 is a worm gear 62 meshing with a worm 63.

Said worm 63 is mounted upon the lower end of a shaft 64 having upon the upper end thereof a hand wheel 65 adjacent the upper end of the pipe 31, whereby said shaft 64 is operated, as shown in Figs. 10 and 11.

By the operation of the said shaft 64, worm 63, worm gear 62, gear 61, and rack 60, the cap 42 is moved forward or rearward upon arm 36 and thus the light rays are focused.

An arrangement of parts exactly similar to that just described, and disposed upon the opposite side of pipe 31 and head 30, is provided for the purpose of moving cap 44 forward or rearward upon arm 37 and thus focusing the image upon screens 46 and 54; said parts are designated as rack 66 and its meshing gear 67, worm gear 68 integral with gear 67, worm 69 upon shaft 70 and hand wheel 71 upon the upper end of said shaft.

The shafts 57, 64 and 70 are made up of short lengths corresponding to the lengths of the sections of pipe 31 and are coupled together by couplings 72, to accomplish the desired depth of submersion of the heads 30 and 34, as shown in Fig. 10.

Head 34 has upon each side thereof hubs or flanges 73 which are secured respectively to one of the shafts 33, said hub 73 being rotatably mounted in capped bearing 74 upon head 30, as shown in detail in Figs. 20 and 21.

The reflecting shield 46 is rotatably mounted upon the axis of shafts 33 within head 34 by means of gudgeon pins, each of said gudgeon pins having a slotted head 75 adapted to receive the reflecting screen 46, and a stem 76 adapted to be seated with an axial aperture 77 upon the inner end of one of shafts 33 respectively, as shown in Fig. 22.

One of said apertures is deeper than the stem 76 therein, as shown at the right in Fig. 22, and said stem is prevented from entering said aperture too far by means of a cross pin 78[a] therein.

To remove the reflecting screen 46, remove cross pin 78[a] and allow the stem 76 to enter the elongated orifice, which will disengage the corresponding slotted head 75 from the screen 46 allowing the same sufficient freedom of movement for removal.

The second of said units comprises a barge 76 having suspended therefrom a cable 77 with suitable grapples upon the end thereof to engage with the mast, rigging or other convenient portions of the submerged ship, as shown in Fig. 1.

Having thus secured a hold upon the ship, said cable is hauled up by suitable machinery upon barge 76, to be hereinafter described, and the submerged ship is righted, as shown in Fig. 2, and is held in such righted position during all subsequent operations previous to the actual raising of the ship.

The third one of said units comprises a submarine gun 78 adapted to be lowered from a barge 79 and held in contact with the ship by magnetic attraction to the hull thereof. A projectile within said gun is adapted to be discharged against the hull of the ship and to pierce and enter same, carrying therewith a cable 80 the upper end of which is attached to suitable hoisting machinery upon barge 79 to be described hereinafter.

A sufficient number of shots are made and cables thus secured upon each side of the submerged ship to raise the same when said cables are hoisted, as shown in Fig. 4.

The said gun 78 is shown in detailed longitudinal sectional elevation upon an enlarged scale in Fig. 11, wherein the gun barrel 78 having a flanged head 80[c], is secured by bolts 81 to a flange 82 upon an air cylinder 83, said cylinder 83 being closed water tight at its forward end by means of a plate 84 of brittle material as cast iron, glass or the like.

The function of air cylinder 83 is to exclude water from the path of the projectile between the gun barrel and the ship's hull, the projectile breaking the plate 84 as it emerges from the air cylinder.

The projectile is formed with a dart shaped or pointed head 85 and a cylindrical tail 86 as shown in Fig. 12, said tail being adapted to enter the bore of the gun barrel 79 as shown in Fig. 8.

A charge of explosive 87 is inserted in the gun barrel behind the projectile, and a spark plug 88 is provided for the purpose of electrically firing said explosive, the spark plug being connected by means of an electric cable 89 to a suitable switch in an electric power circuit upon the tug 41.

A chain 90 is secured to the rear of head 85, (by means of a pin 91 and parallel flanges 92 intermediate which one link of said chain engages said pin, as illustrated in Figs. 8 and 9) and when the projectile is in place within the gun barrel 79 said chain is wrapped several times around a cone 93 projecting forward from said gun barrel and integral therewith.

The function of said cone is to provide a depository for said chain 90 wherefrom the chain will readily uncoil when the projectile leaves the gun.

The chain 90 is secured at the end thereof opposite that secured to said projectile to cable 80, said cable passing plate 84 in a water tight manner by means of a stuffing box 94 therein packed with lead or the like, as shown in Fig. 8.

Convenient eyes 95 are provided upon the gun and the air cylinder, as shown in Fig. 8, for the purpose of attaching thereto lifting cables operated from machinery in barge 79 to be described hereinafter, as shown in Fig. 2.

By the manipulation of said cables 96 the gun may be raised, or lowered, or tilted at any desired angle to suit conditions, and the gun may thus be placed substantially normal to the hull surface of the submerged ship, as shown in dotted lines in Fig. 8.

A magnet coil 97 is placed upon the forward end of air chamber 83 in a recess 98 provided therefor, and is connected to a suitable switch in an electric power circuit upon tug 41 by means of cable 99.

After the submerged ship has been righted as shown in Fig. 1, the gun 78 is lowered from barge 79 and the forward end thereof is placed adjacent to or in contact with the hull of said ship, as shown in Fig. 2, the operation and manipulation of said gun being in obedience to signals from tug 41 upon which an attendant is observing each movement of the gun by means of the telescopic periscope previously described.

When the gun has been manipulated into position against or near the ship's hull desired by the observing attendant upon tug 41, said attendant closes a switch upon a power circuit which energizes magnet coil 97 and magnetizes the air chamber 83, thus causing the gun to hold fast to the vessel hull in the position desired by the observing operator.

Said operator now closes a switch upon a power circuit on tug 41 which switch places cable 89 in said circuit and thus fires the explosive 78 within said gun barrel 79, thus discharging projectile 85 therefrom.

Upon being discharged, projectile 85 traverses air chamber 83, breaks plate 84 at the end thereof, pierces the shell of said vessel hull and enters the same carrying with it chain 90 and the attached end of cable 80.

The observing attendant upon tug 41 now releases the gun from the vessel hull by opening the switch upon cable 99 and thus deenergizing the magnetic air cylinder 83.

The gun is then hauled aboard the barge 79 by means of cables 96 and is then recharged with another projectile chain and cable, ready for another operation.

The cable 80 is made reasonably taut by hauling the same in upon barge 79, the dart like projectile within the hull securing the lower end of said cable to the ship.

This operation of the gun is repeated until a sufficient number of cables 80 are secured upon each side of the submerged vessel to raise same, as shown in Fig. 4.

The fourth unit of my system, means for lowering tanks alongside the submerged vessel and for locating and securing said tanks is illustrated in Figs. 3 and 4, and the details in Figs. 5, 6, 7, 16, and 17.

One set, consisting of a pair or more, of cables $80^a$ are passed once around a tank 100, said tank being intermediate the submerged ship and the barge 75 and floating upon the surface of the water, as shown at the left of Fig. 3.

Another set consisting of two or more of cables $80^b$ are then passed several times around the tank 100 in a direction opposite to the winding of the former cables $80^a$, the former cables being wound so that the cables are tangent to the tank upon the side thereof adjacent the submerged vessel, and the latter cables being wound so that they are tangent to the tank upon the side thereof substantially opposite the point of tangency of the former cables.

The lower ends of all said cables 80 being attached to the submerged vessel by means of the projectile aforementioned, and the upper ends thereof being wound upon suitable hoisting engines upon the barge 79 to be hereinafter described, said cables thereupon form suitable and convenient means of guiding said tanks 100 into place contiguous to the hull of the submerged ship, as shown at the right of Fig. 3 and in Fig. 4.

For the purpose of description those cables 80 wound upon the tank in the former manner are further designated $80^a$ in Fig. 3, and those wound in the latter manner are further designated $80^b$.

If the tank be now filled with water and allowed to sink it will practically roll down upon cables $80^a$, the same winding upon the tank from the lower portion of the cable and unwinding from the tank from the upper portion of cable, thus imparting to the tank a rotary motion upon its axis as it sinks, said cables $80^a$ being retained taut by the machinery upon the barge 79.

While the tank is being thus sunk and rolled along the cables $80^a$ into place, cables $80^b$ act as a band brake upon the tank to enable the speed of sinking the same to be controlled, because of the cable $80^b$ being kept tight enough by the machinery upon the barge 79 it will clamp tightly upon the tank and prevent its rotation, and therefore prevent its sinking, since it cannot sink without rotation being imparted thereto by cables $80^a$.

If the cables $80^b$ are slackened they will slip upon the tank and allow the same to rotate and thus to sink.

The manipulation of cables $80^a$ and $80^b$ to control the submergence of the tank is performed by the operator of the machinery upon barge 79 directed by suitable signals from the observing operator upon tug 41 who constantly watches the tank while it is being submerged, by means of the telescopic periscope previously described, as illustrated in Fig. 3.

Figure 7:
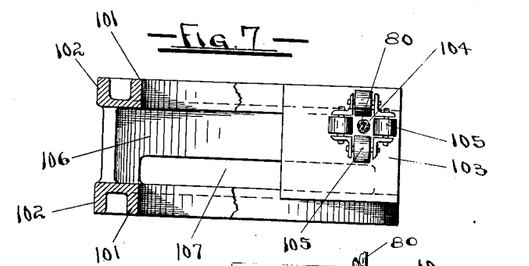
Fig. 7 is a sectional view upon line 10—10 of Fig. 6.

To guide the several ropes and their respective windings upon the tank I provide a cage, as shown in detail in Figs. 5, 6, and 7 which guides the cables properly on to and off of the tank.

Said guides are constructed of parallel sides each having a hub 101 adapted to bear upon the tank and a flange 102, connecting said flanges and disposed to intersect the path of said cables winding upon said tank is a plate 103 having an orifice 104 therein through which said cable passes, and upon which plate are disposed suitable guide rollers 105 to engage the cable.

Opposite said plates 103 is a similar plate 106 connecting the two flanges 102, and having therein an elongated orifice 107 through which the opposite end of said cable passes after the cable has passed once or more around the tank, as shown in Figs. 5 and 6.

The function of the elongated orifice 107 is to confine the cable to a predetermined path longitudinally of the tank while permitting said cable to leave the tank at varying tangential angles, as illustrated in dotted lines in Fig. 6.

The plate has mounted thereon rollers 108 for the purpose of guiding the cable in a manner similar to rollers 105 previously described.

Intermediate plates 104 and 106 and diametrically adjacent the tank is a plate 109 connecting the two flanges 102, and having therein inwardly projecting fingers 110 extending into close proximity to the tank and adapted to enter between adjacent coils of the cable upon the tank and separate said coils thus confining them to their respective paths and preventing one coil climbing upon an adjacent coil, as illustrated in Figs. 5 and 6.

Each of the tanks 100 are connected by a hose 111 to a suitable air pump 112 located upon barge 79.

A three-way valve to be described later is located in said hose by which the operator may either close the hose, open the hose to the atmosphere, or open the hose to pressure from said air pump.

When the tank 100 is floating upon the surface with the cables 80ª and 80ᵇ in place, as shown at the left of Fig. 3, the attendant opens said three-way valve to the atmosphere, thereby allowing the air in the tank free exit therefrom and allowing the water to enter and thus sink the tank.

The rapidity of sinking may be controlled by the manipulation of the ropes 80ª and 80ᵇ as previously described; it may also be controlled by said three-way valve in said hose 111 since by closing the hose the entrance of the water into the tank may be stopped and the tank thereby caused to remain stationary at whatever depth the same is immersed or by opening the said valve to the atmosphere water is allowed to enter the tank and the same sinks to a lower depth; or by opening said valve to pressure from the air pump air is pumped into the tank thereby expelling some water and causing the tank to raise to a lesser depth of submersion.

It is thus evident that by controlling the entrance and exit of air to the tank and manipulating the ropes wound upon the tank the operator has at all times full control of the movement of said tank, and he may thus cause said tank to leave its initial position upon the surface as shown at the left in Fig. 3, and to sink slowly and positively into position adjacent the side of the submerged hull, as shown at the right in Fig. 3, and in Fig. 4.

In order to control the tank by means of the air contained therein it is necessary to provide means whereby the air may be allowed to escape from the top of the tank when the valve is opened to the atmosphere, and also to provide means whereby the water may be allowed to escape from the bottom of the tank when the air is pumped into the same, irrespective of the position of the tank as it rotates.

Figure 16:
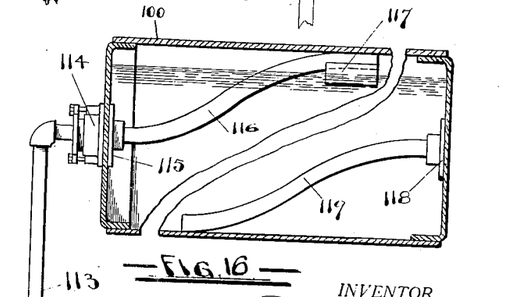
Fig. 16 is a sectional elevation of one of the raising tanks showing the air hose and water hose connections thereto.

Said means are illustrated in Figs. 16 and 17 wherein the hose 111 is attached to a pipe 113 which pipe enters the end of the tank 100 through a stuffing box 114, said pipe being rotatable within said stuffing box.

Upon the inner surface of the end of the tank is a flange 115 which connects with stuffing box 114, and attached to which is a flexible pipe or hose 116 projecting longitudinally of said tank from said flange, the end of said hose 116 being secured to a suitable float 117, whereby the end is always held toward the top of the tank, and thereby the air is always withdrawn from the top irrespective of the position of the tank as it rotates.

Upon the inside surface of the opposite end of the tank is mounted a flange 118, and attached thereto is a flexible pipe or hose 119 projecting longitudinally of said tank from said flange 118, said pipe or hose 119 being formed of heavy material such as will sink in water, thereby insuring that said pipe will always lie upon the bottom of said tank irrespective of the position of the same as it rotates.

When air is pumped into tank 100 through pipe 116 therein water is forced out of said tank through pipe 119 therein, and said water is always expelled from the bottom of the tank.

When a sufficient number of tanks 100 have been lowered and secured alongside the submerged vessel, as previously described and illustrated in Figs. 3 and 4, the cable 77 is detached from the submerged vessel and barge 76 is towed away from its position intermediate barges 79.

Cables 80ª and 80ᵇ are drawn tight by means of suitable machinery upon barges 79, and air is pumped into the several tanks 100, thus causing the same to gradually float the submerged vessel toward the surface, said ropes 80ª and 80ᵇ being constantly hauled in and kept tight during this operation.

The manipulation of the tanks by means of the air within same and the cables wound upon same is conducted in obedience to signals from the observing attendant upon tug 41, who constantly watches the submerged vessel, by means of the telescopic periscope, as it floats upward, and by signaling the operator to fill or empty, raise or lower, one tank or another, enables said operator to raise the submerged vessel upon an even keel.

The operation of the gun and the tanks is accomplished by means of suitable machinery upon the barge, as illustrated in Fig. 15, which shows a plan view of the barge deck having installed thereon steam boilers 125, cranes 126, and power winches 127 opposite each of said cranes.

The barge is provided with a central longitudinal disposed well or opening 128, one side of each winch drum overlapping the side of said well so that the cable from any drum may be dropped downward through said well and operated therethrough, as cable 77 in Figs. 1, 2 and 3.

Cables may also be operated from said drums over said cranes, as cables 96 for operating the gun in Fig. 2, and cables 80ª and 80ᵇ attached to the submerged hull for lifting the same in Figs. 3 and 4.

Preferably, however, the gun cables 96 are operated over said cranes by means of a double drum winch 129, which may be moved upon rails 130 into position opposite any one of cranes 126 desired.

The drums of winches 127 are each operated independently by means of friction clutches 131 engaged or disengaged by means of a steam operated friction clutch throw 132, steam pipes to each friction clutch throw leading from operating valves 133 arranged and located with suitable convenience for the operator.

Each drum is also controlled by a band brake 134 operated by a steam cylinder 135, the steam supply to said brake cylinders through pipes being controlled by valves 136 arranged and located adjacent valves 133 with suitable convenience for the operator.

The above description of said winches is sufficient for the purpose of this specification as no claim for originality is made therefor, and they are of a type well known and extensively used.

Each one of cables 80ª and 80ᵇ is led over one of cranes 126 to its respective winch 127, and thereby the operator is enabled to operate said cables either simultaneously or independently, either slacking off or tightening up on any one or all said cables at will.

The air hose 111 from each of the tanks 100 is carried upon the barge over a roller 137 and stored upon the deck in suitable coils 138, therefrom being led to a three-way valve 139, located adjacent valves 133 and 136 with suitable convenience for the operator, through which valve the hose is connected to the air pump 112.

Only one hose with its coil and roller is illustrated in Fig. 15, it being understood that as many independent lengths of such hose as desired may be installed, each being connected to its respective valve 139, and thereby the operator is enabled to control the admittance or exhaust of air to any one of the tanks 100 at will.

The system of barges 79, cables 80ª and 80ᵇ, and tanks 100 is operated in duplicate, one system upon each side of the submerged vessel, as illustrated in Figs. 2 and 3.

Having disclosed my invention so that others skilled in the art may be enabled to construct and use the same, what I claim as new, and desire to secure by Letters Patent is:—

1. In a system for raising sunken vessels; a cylindrical pneumatic tank; a plurality of hoisting cables, each given several turns about said tank, thereby rotatably mounting said tank upon said cables; means to secure the lower end of each of said cables to said sunken vessel; means to independently tighten or loosen each of said cables; and means to continually withdraw air from said tank independently of the position thereof as it rotates.

2. In a system for raising submerged ships, as a means for attaching hoisting cables thereto; a gun adapted to be lowered from a floating vessel to a position alongside said submerged ship; a projectile within said gun adapted to be discharged therefrom and to enter the hull of said submerged ship; a hoisting cable attached at one end thereof to said projectile and at the opposite end thereof to said floating vessel.

3. In a system of raising sunken vessels, as a means for attaching hoisting cables thereto, a submerged gun suspended from a floating vessel; a projectile within said gun; a hoisting cable suspended from said floating vessel and attached to said projectile; means operable from a floating vessel to discharge said projectile from said gun and into the hull of said sunken vessel carrying the lower end of said cable therewith.

4. In a system for raising sunken vessels, as a means for attaching hoisting cables thereto, a submarine gun suspended from a floating vessel; a sealed air chamber upon the muzzle of said gun; a projectile within said gun the head of said projectile being within said air chamber; and a cable suspended from said floating vessel and attached to said projectile within said air chamber.

5. In a system of raising sunken vessels, as a means for attaching hoisting cables thereto; a submarine gun suspended from a floating vessel, a projectile within said gun; a cable suspended from said floating vessel and attached to said projectile; means operable from said floating vessel for discharging said projectile; magnetic means operable from a floating vessel for attaching said gun upon the hull of said sunken vessel.

6. In a system for raising sunken vessels, as a means for attaching hoisting cables thereto; a submarine gun suspended from a floating vessel and comprising a barrel, a magnetic air chamber attached to the forward end of said barrel, a projectile, and means for operating said gun from a floating vessel.

7. In a system for raising sunken vessels, as a means for attaching hoisting cables thereto; a projectile; a cable fastened at one end thereof to said projectile; means operable from a floating vessel to discharge said projectile and to cause same to enter the hull of said sunken ship carrying the end of said cable therewith.

8. In a system for raising sunken vessels, comprising a rotatable tank and means for securing the same to said sunken vessel; rotatable means for securing an air hose to said tank; a flexible hose within said tank registering with said securing means; a float upon the free end of said flexible hose; and a second flexible hose composed of material heavier than water and connecting with the outside of said tank.

9. In a system for raising sunken vessels comprising a rotatable tank and cables having several turns upon said tank, the lower ends of said cables being fast to said sunken vessel; guides rotatably mounted upon said tank, each of said guides receiving the upwardly projecting portion of one of said cables, allowing several turns of said cable around said tank within said guide, and having means of egress therefrom for the downwardly projecting portion of said cable.

10. In a system for raising sunken vessels; means operable from a floating vessel for attaching hoisting cables to said sunken vessel; a plurality of cables suspended from a floating vessel and secured to said sunken vessel by said attaching means; and a plurality of rotatable cylindrical pneumatic tanks longitudinally disposed and having several peripheral wraps of said cables thereon and adapted to be lowered alongside said sunken vessel, said tanks being guided and controlled during said lowering by means of said cables, and also being secured in position alongside of said sunken vessel by means of said cables after said lowering has been accomplished.

11. In a system for raising sunken vessels; a plurality of cables suspended from a floating vessel; a plurality of pneumatic tanks; a number of said cables being coiled upon one of said tanks in one direction and a number of said cables being coiled upon the same tank in the opposite direction, each of said tanks having cables coiled thereon, and each of said cables passing downward from its respective tank after being given a few coils thereon; means for attaching the lower end of each of said cables to said sunken vessel; and pneumatic means for expelling water from said tanks after the same have been lowered and secured in place alongside said sunken vessel.

12. In a system for raising sunken vessels; a plurality of cables suspended from a floating vessel; means for attaching said cables to a sunken vessel; a plurality of longitudinally disposed rotatable cylindrical pneumatic tanks adapted to be lowered alongside said sunken vessel, said tanks being guided and controlled by peripheral wraps of said cables thereon.

13. In a system for raising submerged vessels by means of longitudinally disposed rotatable cylindrical pneumatic tanks; means to operate said tanks comprising an air hose connected to an air pump upon a floating vessel, said hose being suspended from said floating vessel and the lower end thereof being rotatably connected to said pneumatic tank; means to lower said tank horizontally into place; and means whereby said tank may be filled with air thus expelling all the water therefrom, or filled with water thus expelling the air therefrom, irrespective of the position of said tank.

14. In a system for raising submerged vessels by means of pneumatic tanks; a tank; a flexible air hose within said tank, one end thereof being connected to a float, the other end being connected to one end of said tank adjacent the longitudinal axis thereof; a hose exterior of said tank and suspended from a floating vessel; a flexible or swivel connection between said interior hose and said exterior hose; a heavy flexible water pipe within said tank, one end thereof being connected to one of said tanks adjacent the longitudinal axis thereof and connecting with the exterior of said tank; and means whereby said tank may be confined to a horizontal position while being lowered and submerged.

In witness whereof I claim the foregoing as my own I hereunto affix my signature in the presence of two subscribing witnesses.

DANIEL F. McGILL.

Witnesses:
C. F. BLAKE,
C. S. BROWN.